United States Patent [19]
Tonutti

[11] Patent Number: 5,146,736
[45] Date of Patent: Sep. 15, 1992

[54] REVERSIBLE ATTACHMENT FOR THREE POINT HITCH RAKES TO TRACTOR

[75] Inventor: Carletto Tonutti, Tricesmio, Italy

[73] Assignee: Tonutti S.p.A., Italy

[21] Appl. No.: 717,270

[22] Filed: Jun. 18, 1991

[30] Foreign Application Priority Data

Jun. 21, 1990 [IT] Italy .............................. 60381/90[U]

[51] Int. Cl.[5] .......................................... A01D 67/00
[52] U.S. Cl. ...................................... 56/14.9; 56/15.6
[58] Field of Search ...................... 56/14.9, 15.1, 15.6, 56/DIG. 14, 15.9, 16.1

[56] References Cited

U.S. PATENT DOCUMENTS 5,025,616  6/1991  Moss ..................................... 56/14.9
5,094,063  3/1992  Wattron et al. ................. 56/14.9 X

OTHER PUBLICATIONS

OTMA Rake Operator's Manual, Agricultural Implements, Italy.
Tonutti S.p.A. Rake Operator's Manual, Tonutti S.p.A., Italy.
Universal Niemeyer Haymaker KRW 400, H. Niemeyer Sohne GmbH & Co. KG.
Tonutti S.p.A. Three Point Hitch Hay Rakes, Tonutti S.p.A., Italy.

Primary Examiner—Thuy M. Bui
Attorney, Agent, or Firm—Andrus, Sceales, Starke & Sawall

[57] ABSTRACT

The present invention regards a mechanical device which is an attachment able to support a three point hitch type rake and which is applied to the rear of a tractor. Its structure has been devised in order to allow for a greater versatility in its uses according to the working necessities of the rake. In fact, with a simple action on the pivot (15) and on the side regulating assembly, it is possible to orientate the same on the right-hand side and on the left-hand side, effecting a 180 degree rotation.

7 Claims, 2 Drawing Sheets

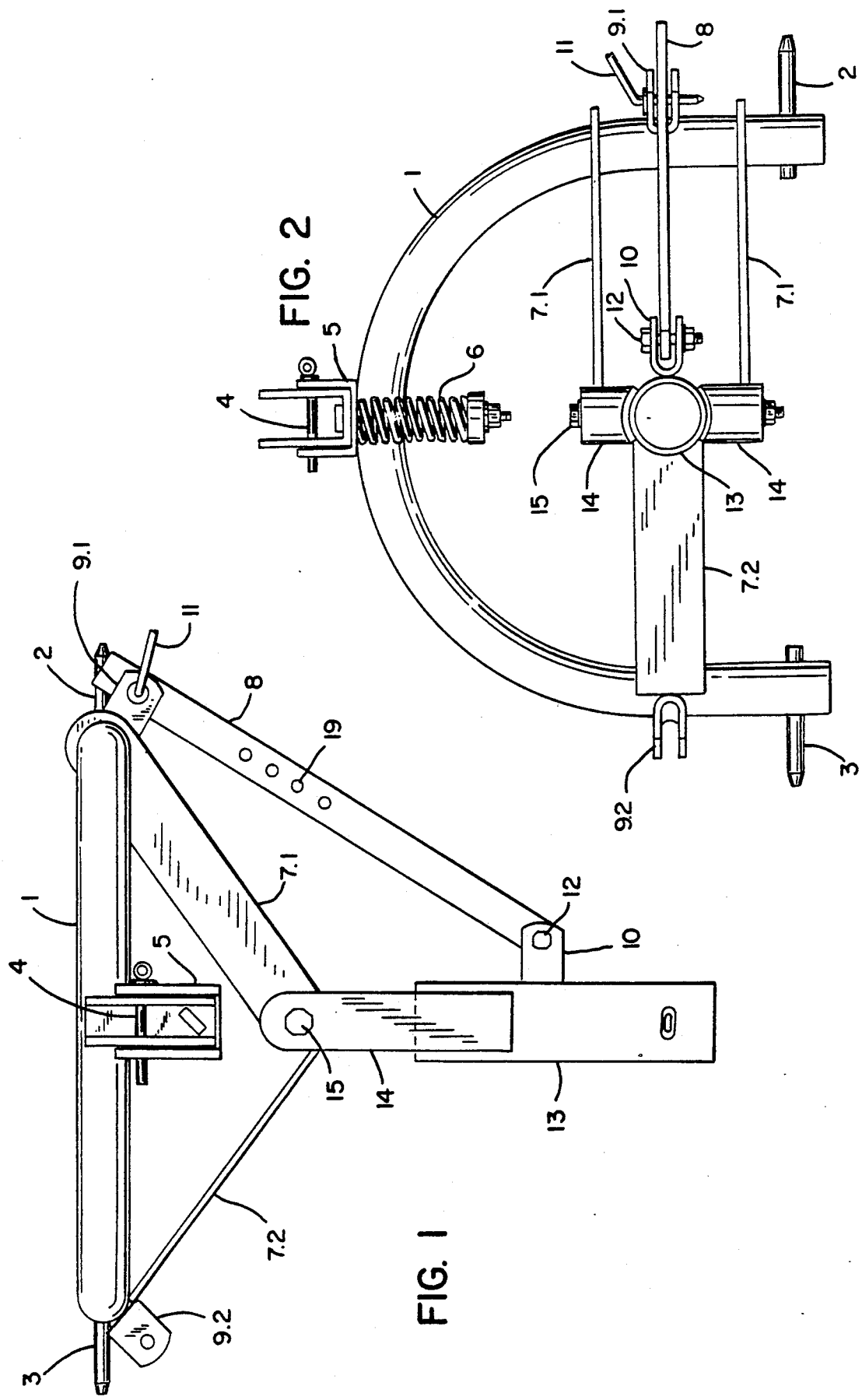

REVERSIBLE ATTACHMENT FOR THREE POINT HITCH RAKES TO TRACTOR

BACKGROUND AND SUMMARY

The present model of industrial utility regards an attachment which is able to support a three point hitch type rake and is applied to the rear of an agricultural tractor. Its structure has been so devised, in order to allow for a greater versatility in its uses, according to the working necessities of the rake. In fact, with a simple action on the central pivot and on the side regulating assembly it is possible to orientate the same on the right hand side and on the left hand side, effecting a 180 degree rotation.

The three points of anchorage are constantly fixed to the tractor.

The attachment of a rake to this attachment is obtained with a cylindrical tube into which the male attachment of the rake is fitted and is locked into position with a suitable pin or bolt. As this point of junction is hinged to the structure, it is possible to obtain angular adjustments through a side bar which has many holes and can also be adjusted. This bar joins the supporting tube to the structure of the anchorage of the three points.

Furthermore, a spring will be used so that the attachment can oscillate during transport and during the working phase of the rake.

The simplicity of the structure and its versatile operations added to the fact that it is easy to handle for the operator, makes this attachment very competitive in its specific market section.

BRIEF DESCRIPTION OF THE DRAWINGS

The above-mentioned characteristics will be better understood and evidenced and new characteristics will appear looking at the following detailed description of an example of production with the help of the three enclosed drawings, where the following is revealed:

In FIG. 1 a top view of the attachment with the side adjusting bar placed on the right hand side;

In FIG. 2 a front view of the attachment evidencing the arch structure of the three points of the rear anchorage of the tractor;

DETAILED DESCRIPTION OF THE INVENTION

Figure 3:
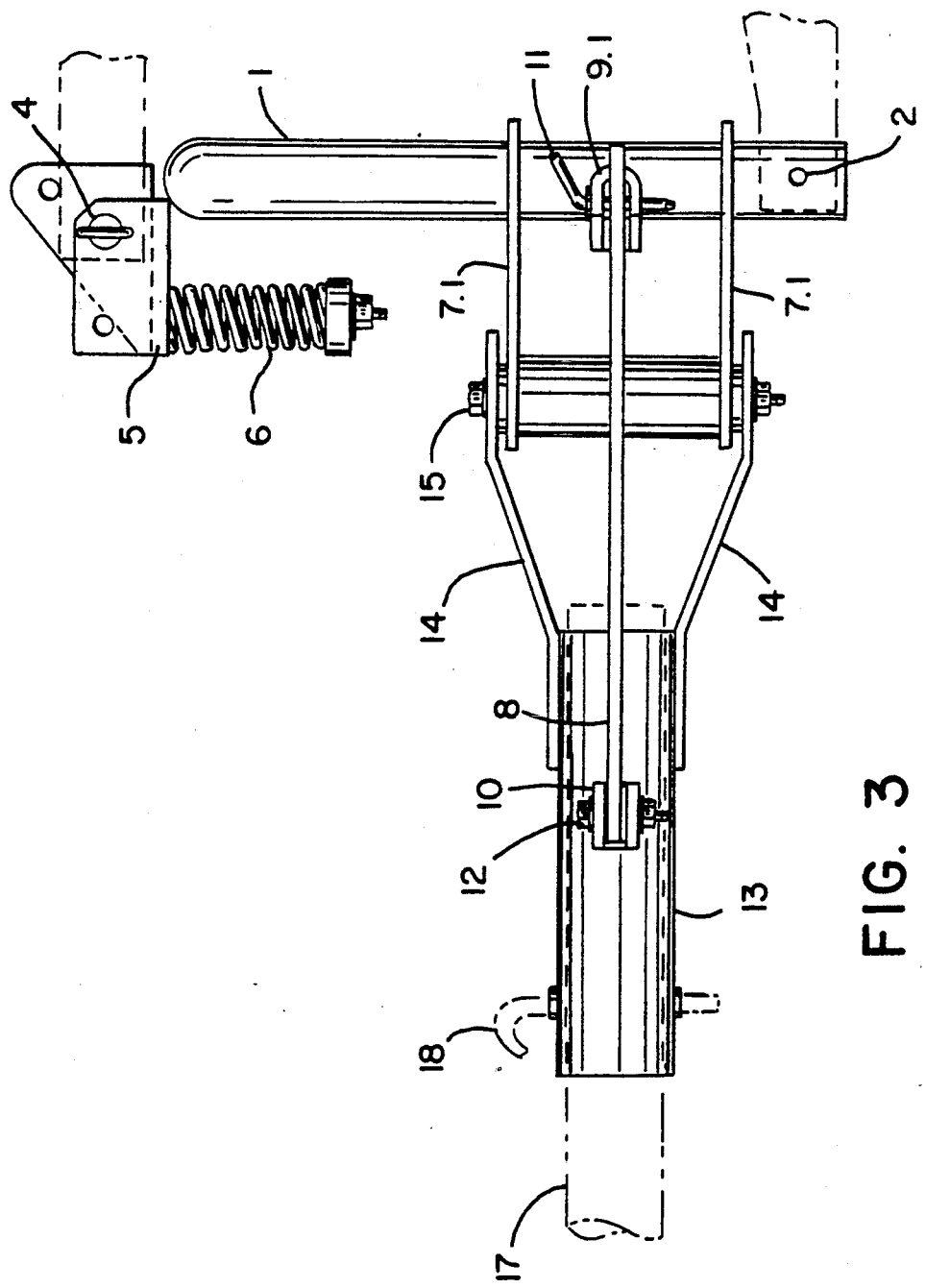
In FIG. 3 a side view of attachment.

The above drawings reveal the attachment, to hold which a rake to anchor to the rear three points of the tractor, is made up of a main frame (1) which has an arch shape in tubular metal, with a convex connection toward the top. On the two lower arms, on the vertical part, on the side, in a horizontal sense the two pivots (2 and 3), are needed to anchor the attachment to the two lower points of the tractor. Above the arch and to the center, is the third point for anchoring (4). This part is made of two elements, one is the coupling (4) and the other (5) is equipped with a spring (6) which has the function of absorbing the oscillations of the structure under pressure and/or during the working phase.

From the main frame (1) to the side there are support blades to the point of support of the rake (17) (FIG. 3).

The first oblique blade (7.2) converges to the center in a horizontal position and the two second blades (7.1) also oblique converge onto a hinged support (15). From this hinge there are two blades (14), a lower one and a higher one which go horizontally to the cylinder tube (13) and are able to receive the cylindric male joint of the, rake (17). On this tube (13) there is a vertical lock which is worked with the necessary pin (18).

The above-mentioned cylindric tube (13) has the possibility to be regulated at angles as it is fixed onto the blades (14) which are hinged onto the support (15) with a fork side blockage (10), with screw (12), and bar (8) with many holes (19). Forks (9.1 and 9.2) on the right-hand side and left-hand side and pin (11) allow the tube (13) to be moved to varying angular positions depending on which opening (19) is positioned at the forks (9.1, 9.2) and engaged by the pin (11).

The central support tube (13) can be disassembled and rotated at 180 degrees, from the right to the left and vice versa according to the necessities of use, by disassembling the hinged support (15) and rotating it on the side wanted including the multi-holed bar (8). In this way the attachment is versatile and operative with the angular adjustment on both the right and left side.

Naturally, the working particulars can vary without altering the innovation of the attachment as described, illustrated and as hereunder claimed.

I claim:

1. An attachment for interposition between a tractor and an implement adapted to be towed by the tractor, comprising:
   a frame mountable to the rear of the tractor;
   a hinge assembly connected to the frame and defining a substantially vertical hinge axis;
   an implement mounting assembly for receiving a connecting portion of the implement, the implement mounting assembly being connectable to the hinge assembly so as to be pivotable about the hinge axis; and
   a positioning assembly disposed between the implement mounting assembly and the frame for establishing the position of the implement mounting assembly relative to the frame by selectively preventing pivoting movement of the implement mounting assembly about the hinge axis.

2. The attachment of claim 1, wherein the positioning assembly is movable to varying positions for selectively preventing pivoting movement of the implement mounting assembly at varying pivoting positions of the implement mounting assembly about the hinge axis.

3. The attachment of claim 2, wherein the positioning assembly comprises a bar having a plurality of openings along its length, wherein the bar is pivotably connected at one of its ends to the implement mounting assembly, and is connectable to the frame by a releasable connecting arrangement including a pin engageable with a selected opening in the bar, to control the position of the implement mounting assembly relative to the frame.

4. The attachment of claim 2, wherein the implement mounting assembly is removably connected to the hinge assembly, and is movable between a first mounting position in which the positioning assembly is interposed between the implement mounting assembly and one of the vertical frame legs, and a second mounting position in which the positioning assembly is interposed between the implement mounting assembly and the other of the vertical frame legs.

5. The attachment of claim 4, wherein the implement mounting assembly comprises a pair of spaced blades, and further comprising a removable connection arrangement allowing the blades to be removed from and reconnected to the hinge assembly.

6. The attachment of claim 5, wherein the positioning assembly comprises a bar having a plurality of openings along its length, wherein the bar is pivotably connected at one of its ends to the implement mounting assembly, and is connectable to the vertical legs of the frame by a releasable connecting arrangement provided on each leg, and including a pin engageable with a selected opening in the bar, to control the position of the implement mounting assembly relative to the frame.

7. The attachment of claim 1, wherein the frame includes a pair of spaced substantially vertical legs, and wherein the positioning assembly is interposed between the implement mounting assembly and one of the vertical frame legs.

* * * * *